(12) United States Patent
Goldstein

(10) Patent No.: US 8,430,379 B2
(45) Date of Patent: Apr. 30, 2013

(54) APPARATUS FOR DISPENSING FOG

(76) Inventor: Ido Goldstein, Sacramento, CA (US)

( * ) Notice: Subject to any disclaimer, the term of this patent is extended or adjusted under 35 U.S.C. 154(b) by 447 days.

(21) Appl. No.: 12/912,947

(22) Filed: Oct. 27, 2010

(65) Prior Publication Data

US 2012/0104635 A1    May 3, 2012

(51) Int. Cl.
*B01F 3/04* (2006.01)
(52) U.S. Cl.
USPC ....... 261/70; 261/78.2; 239/428.5; 239/434.5
(58) Field of Classification Search ............... 261/70, 261/78.2, 116; 239/428.5, 429, 434.5
See application file for complete search history.

(56) References Cited

U.S. PATENT DOCUMENTS

| 3,130,914 | A | * | 4/1964 | Carkin et al. | 239/433 |
| 3,217,986 | A | * | 11/1965 | Davis, Sr. et al. | 239/403 |
| 4,002,297 | A | * | 1/1977 | Pillard | 239/429 |
| 4,714,199 | A | * | 12/1987 | Heath et al. | 239/412 |
| 2007/0164459 | A1 | * | 7/2007 | Gottlieb et al. | 261/78.2 |
| 2010/0116900 | A1 | * | 5/2010 | Wurz | 239/8 |

* cited by examiner

*Primary Examiner* — Charles Bushey
(74) *Attorney, Agent, or Firm* — Sinorica, LLC

(57) ABSTRACT

An apparatus for dispensing fog by means of continually discharging water particles for humidification, sanitation, and dust suppression. The apparatus provides the user a device that utilizes pressurized gases for the de-correlation of water to generate and dispense water particles. The present invention makes use of a uniquely structured nozzle to dispense water particles that will not be attracted to one another.

20 Claims, 8 Drawing Sheets

APPARATUS FOR DISPENSING FOG

FIELD OF THE INVENTION

The present invention relates generally to an apparatus for dispensing fog. More particularly, its objective is to continually discharge a fluid without wetting exposed surfaces. The present invention is intended for, but not limited to, humidification, sanitation, and dust suppression.

BACKGROUND OF THE INVENTION

Typical humidifiers or fine fluid dispensers require a wick, fan, impeller, or ultrasonic means to create water droplets small enough to be considered as fog or steam. As fog, the water is no longer considered to be in liquid form. By being in vapor form, more water content can be added to the air to increase the relative humidity within a room or household. The purpose of humidifiers is to saturate the air with more water, to provide the users with a more comfortable environment, and to save wooded homes from long-term wear and tear. Humidity is the amount of moisture in the air. Relative humidity refers to the actual amount of water vapor in the air compared to the amount of water vapor the air can potentially contain at a given temperature. An increase in temperature of the air increases the amount of water the air can hold. Similarly, a decrease in temperature of the air decreases the amount of water the air can hold. For example, one may know that air at 20 degrees can potentially hold a maximum 18 grams of water. If the temperature of the air reads 20 degrees and the water in fact contains 18 grams of water, then the relative humidity is said to be 100%. If the air contains 9 grams of water, then the relative humidity is 50%. According to the U.S. Environmental Protection Agency, the ideal range of relative humidity for homes is 30-50%. If relative humidity reaches below this range, then the environment is said to have a low relative humidity. For residents in regions of low relative humidity whereby dry skin and static electricity develop, the need for humidifiers is ever increasing. Cities such as Yuma, Ariz. whose average relative humidity ranges from 22% to 50% have an increasing need to saturate their air with more water content. In addition to the home's HVAC (heating, ventilating, and air conditioning) system, many processes require the use of a humidification or fogging system. Wineries, cold storage, food safety rooms, greenhouses, textile industries, and ripening rooms are among the many environments that require the use of a humidification system. The present invention provides a means to diffuse water particles into the air without wetting exposed surfaces. The process by which the present invention operates can be used to primarily regulate the humidity within a small environment. Other uses include, but are not excluded to, dust suppression, disinfection/sanitation, evaporative cooling, fogging, and spraying.

DETAIL DESCRIPTIONS OF THE INVENTION

Figure 1:
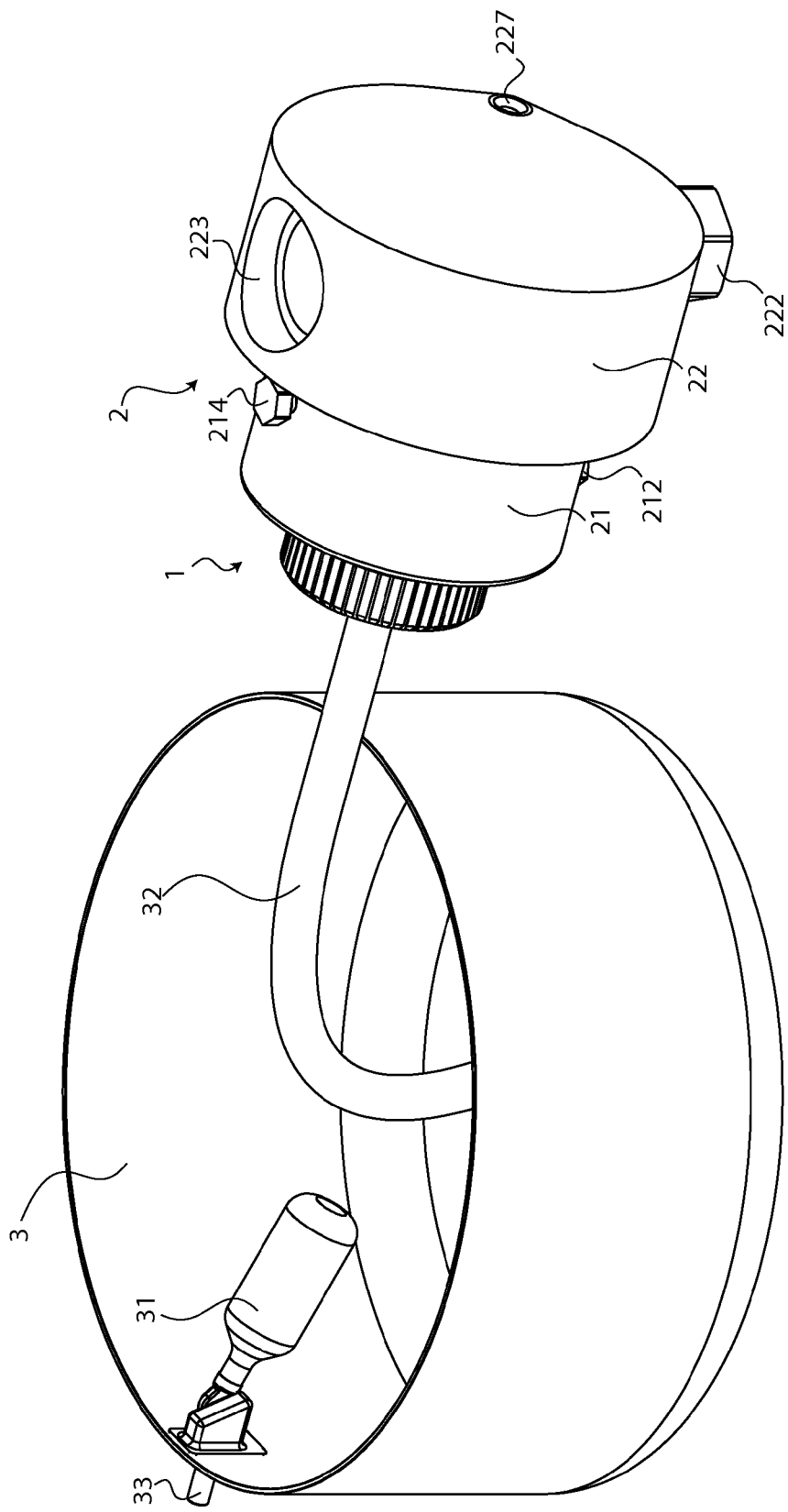
FIG. 1 is a perspective view of the entire assembly for the present invention.

All illustrations of the drawings are for the purpose of describing selected versions of the present invention and are not intended to limit the scope of the present invention.

The present invention involves an apparatus used to dispense fog. A plurality of components accomplishes the task of diffusing a body of water into fine particles by means of a gas infusion. This task of diffusing a body of water into fine particles creates fog, which increases the humidity of the exposed environment. The present invention is intended for, but not limited to, humidification, sanitation, dust suppression, and climate control. The present invention is broken up into three main sections including a nozzle body 1, a nozzle adapter 2, and a reservoir 3. The nozzle body 1 is the main component of the invention that dispenses the water. The nozzle adaptor 2 acts as a support to hold the nozzle body 1 and also helps the nozzle body 1 dispenses the dispensed water as fine water particles. The reservoir 3 is the storage compartment that is able to hold the water for the present invention. The nozzle body 1 and the nozzle adaptor 2 work together to pull the water from the reservoir 3 and dispenses the water as fine water particles in the form of fog. The nozzle body 1, the nozzle adaptor 2, and reservoir 3 are able to achieve this purpose using its unique internal mechanisms. The nozzle adapter 2 comprises of two main sections including an adapter neck 21 and an adapter head 22.

Figure 2:
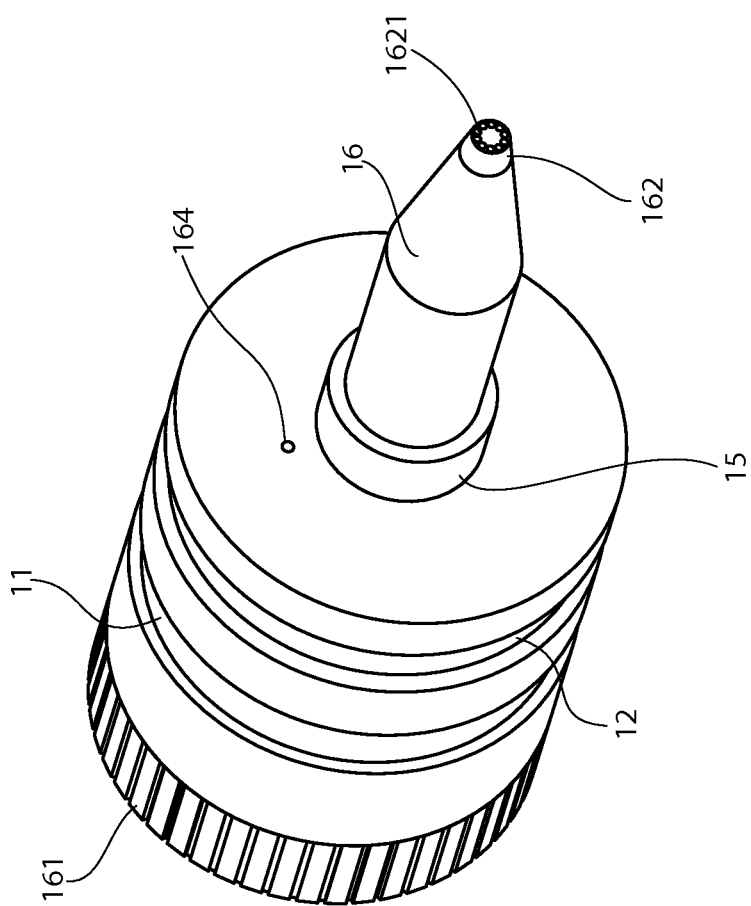
FIG. 2 is a perspective view of the nozzle body and nozzle of the present invention.
Figure 3:
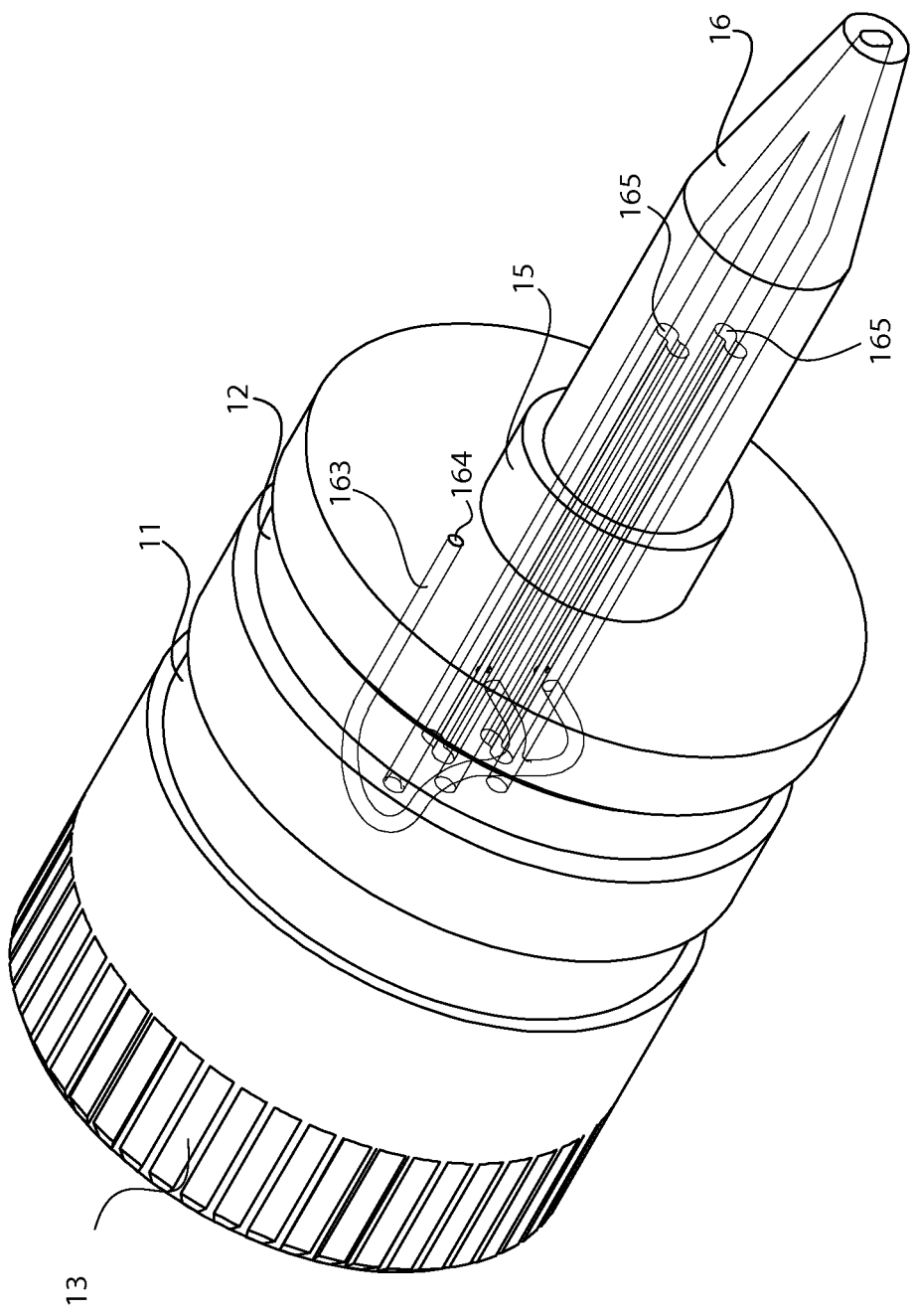
FIG. 3 is a perspective view see through view detailing the plurality of nozzle tubes, the nozzle gas inlet channel, and the plurality of pockets.
Figure 4:
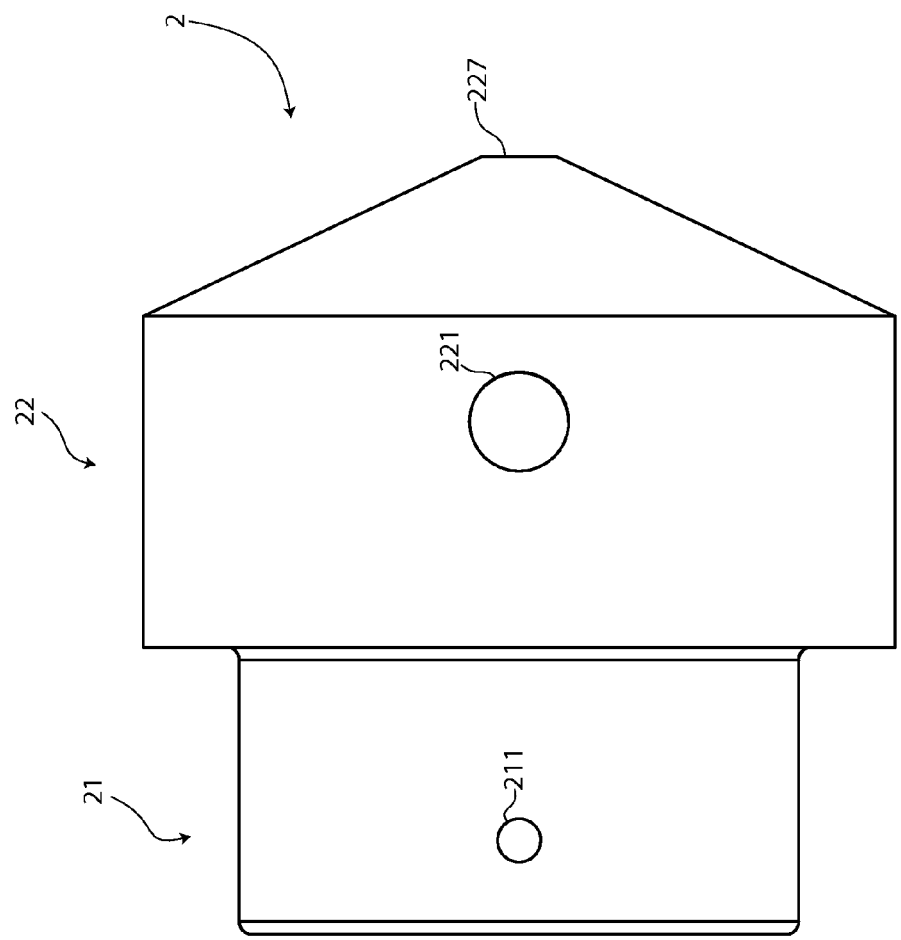
FIG. 4 is a bottom plan view of the nozzle adapter.
Figure 5:
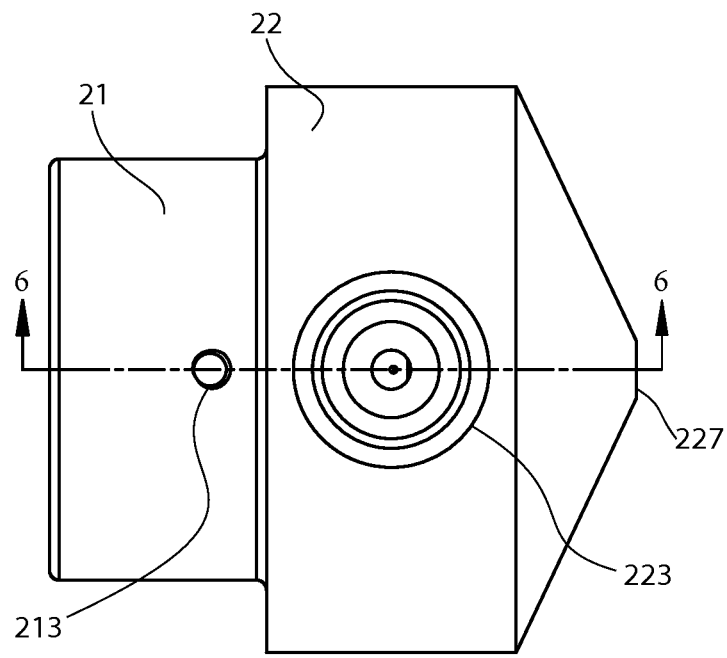
FIG. 5 is a top plan view of the nozzle adapter showing a plane upon which a sectional view is taken and shown in FIG. 6.
Figure 6:
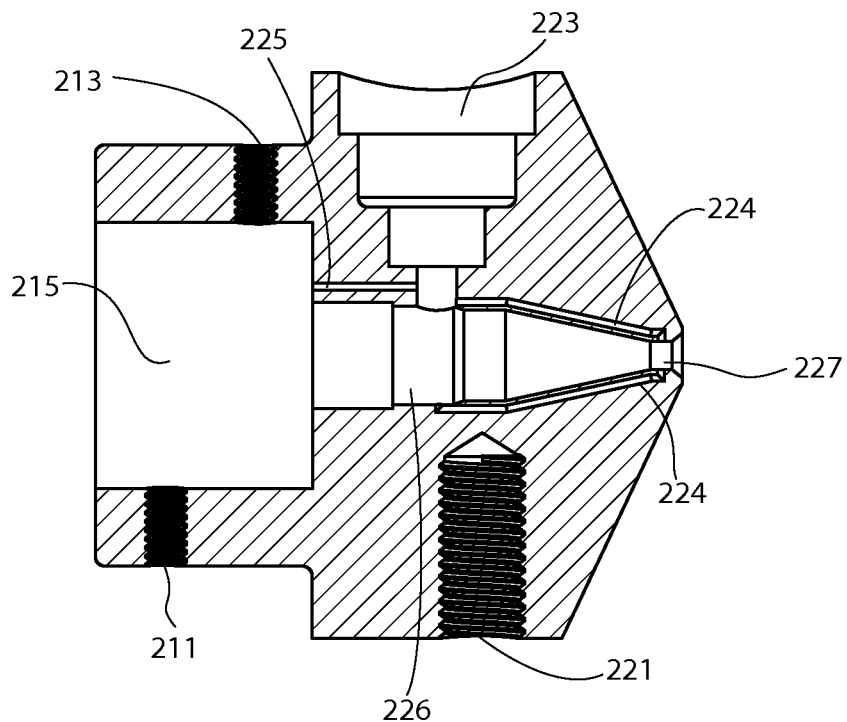
FIG. 6 is a left side view showing the cross section of the nozzle adapter.
Figure 7:
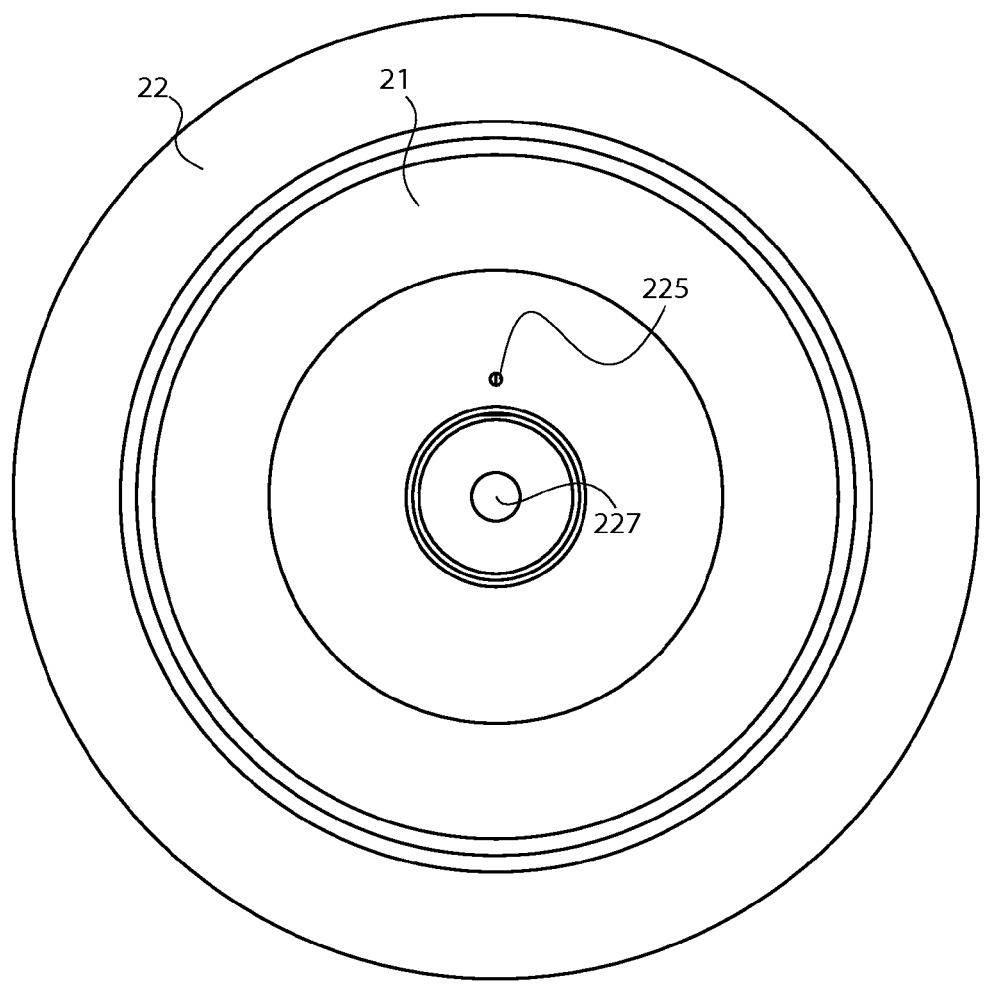
FIG. 7 is a rear elevational view of the nozzle adapter.
Figure 10:
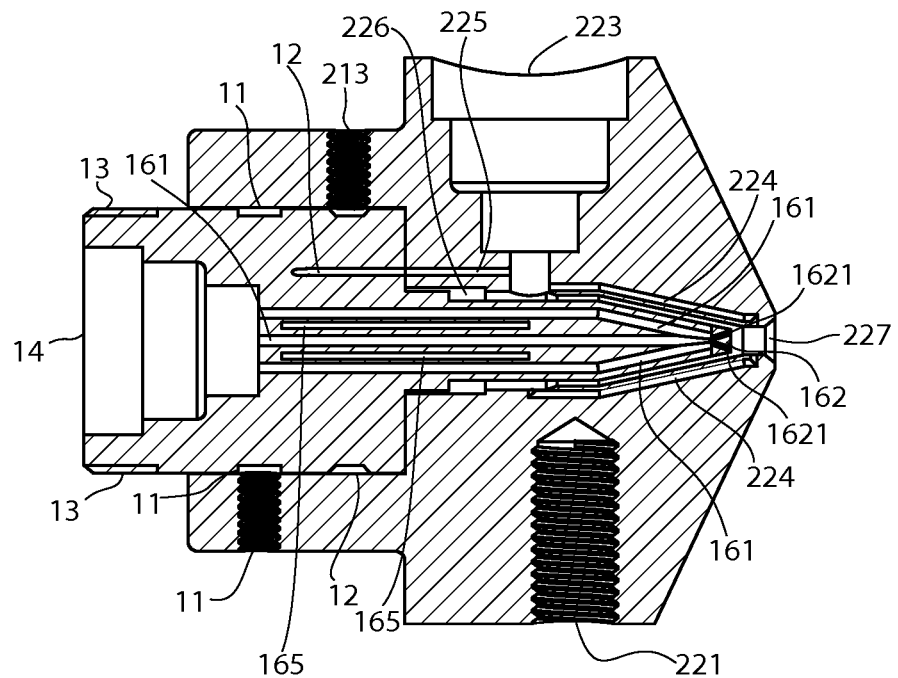
FIG. 10 is a left side view showing the cross section of the nozzle body inserted into the nozzle adapter.

In reference to FIG. 2, FIG. 3, and FIG. 10, the nozzle body 1 being the component of the present invention that receives and dispenses water as fine particles comprises of a locking indentation 11, an adjustment indentation 12, a plurality of ridges 13, a water feed port tank 14, an O-ring seal 15, and a nozzle 16. The locking indentation 11 is an indentation that is positioned peripherally about the circumference of the nozzle body 1. Similarly, the adjustment indentation 12 is an indentation that is positioned peripherally about the circumference of the nozzle body 1. The adjustment indentation 12 and the locking indentation 11 are position adjacent to one another on the nozzle body 1. The plurality of ridges 13 is peripherally positioned on the circumference towards the rear end of the nozzle body 1. The nozzle 16 of the present invention protrudes from the front end of nozzle body 1. The nozzle 16 is positioned in a concentric relationship to the nozzle body 1. The O-ring seal 15 is positioned peripherally about the circumference of the nozzle 16 and is connected to the front body of the nozzle body 1. The water feed port tank 14 is a recessed space positioned on the rear end of the nozzle 16 base.

In reference to FIG. 3 and FIG. 10, the nozzle 16 comprises of a plurality of nozzle tubes 161, a diffuser 162, a nozzle gas inlet channel 163, and a plurality of pockets 165. The diffuser 162 is positioned on the tip of the nozzle 16 opposite of the front end of the nozzle body 1. The plurality of nozzle tubes 161 is positioned within the nozzle 16. The plurality of nozzle tubes 161 run along the length of the entire nozzle 16 and converge towards the diffuser 162. The water feed port tank 14 is connected to the diffuser 162 by the plurality of nozzle tubes 161. The diffuser 162 further comprises of a plurality of diffuser holes 1621. The plurality of diffuser holes 1621 is holes through the diffuser 162 that connect the plurality of nozzle tubes 161 to the outside environment. In the preferred embodiment of the present invention, there are ten diffuser holes that are arranged in a circular pattern. The plurality of diffuser holes 1621 all diverge from the connection to the plurality of nozzle tubes 161. Within the nozzle 16 and between the plurality of nozzle tubes 161 is positioned the plurality of pockets 165. The plurality of pockets 165 is empty elongated pockets that are able to hold a volume of air or gas. On the front end of the nozzle body 1 adjacent to the nozzle 16 is positioned the nozzle gas inlet opening 164. The nozzle gas inlet opening 164 is connected to the plurality of pockets 165 by means of the nozzle gas inlet channel 163.

In reference to FIG. 4-7, and FIG. 10, the adapter neck 21 is adjacently connected to the adapter head 22 in a concentric relationship. The adapter neck 21 comprises of a locking shred 211, a locking screw 212, an adjustment shred 213, an adjustment screw 214, and a nozzle body cavity 215. The adapter head 22 comprises of a mounting shred 221, a mounting screw 222, a gas inlet port 223, gas tubes 224, a nozzle gas branch channel 225, a nozzle cavity 226, and an adapter outlet 227. The nozzle body cavity 215 is a recessed body space positioned on the rear adapter end of the adapter neck 21. The nozzle body cavity 215 is shaped to fit the nozzle body 1. The locking shred 211 is a threaded hole that is positioned on the adapter neck 21 leading into the nozzle body cavity 215. The adjustment shred 213 is similarly positioned on the adapter neck 21 leading into the nozzle body cavity 215. The nozzle cavity 226 is a nozzle 16 shaped space positioned concentrically within the adapter head 22. The adapter outlet 227 is a hole that is positioned on the front adapter end on the adapter head 22. The adapter outlet 227 is connected to the nozzle cavity 226. The mounting shred 221 is a threaded circular recessed space that is positioned on the side of the adapter head 22. The mounting shred 221 allows the nozzle adapter 2 to be mounted onto a table, a counter, a wall, or any other stable surfaces by means of the mounting screw 222. The recessed space of the mounting shred 221 partially passes through the adapter head 22 and stops before reaching the nozzle cavity 226. The gas inlet port 223 is an indented hole that is positioned on the adapter head 22. The gas inlet port 223 leads into the nozzle cavity 226. In the preferred embodiment of the present invention, the gas inlet port 223 is a three layered threaded indentation hole. The gas tubes 224 are positioned within the adapter head 22 adjacent to the nozzle cavity 226. The gas tubes 224 are channels that connect the gas inlet port 223 directly to the adapter outlet 227. The gas inlet port 223 is also connected directly to the nozzle body cavity 215 be means of the nozzle gas branch channel 225. In the preferred embodiment of the present invention, the adapter neck 21 and the adapter head 22 are cylindrically shaped. The adapter neck 21 has a diameter smaller than the diameter of the adapter head 22. The front adapter end is tapered to have a conical shape with the adapter outlet 227 positioned on the apex of the front end. With the adapter head 22 having a larger diameter than the adapter neck 21, the mounting shred 221 is able to traverse the thickness of the adapter head 22 without puncturing into the nozzle cavity 226. The adapter neck 21 possesses a smaller diameter and thinner casing allowing the adjustment shred 213 and the locking shred 211 to easily connect to the nozzle body cavity 215.

In reference to FIG. 1, the reservoir 3 comprises of a float valve 31, a water feed 32, and a liquid source 33. The reservoir 3 is a water tank that holds water a predetermined amount of water on standby to be drawn by the nozzle body 1 and nozzle adapter 2. The float valve 31 ensures that the reservoir 3 maintains a consistent volume of water. As water is drawn from the level of the float on the float valve 31 is lowered causing the valve to open. The float valve 31 being connected to the liquid source 33, will then allow additional water to be released into the reservoir 3 until the volume of water reaches a specified amount. The water is drawn from the reservoir 3 by means of the water feed 32. The water feed 32 is a tube that connects the water feed port tank 14 to the water in the reservoir 3.

Figure 8:
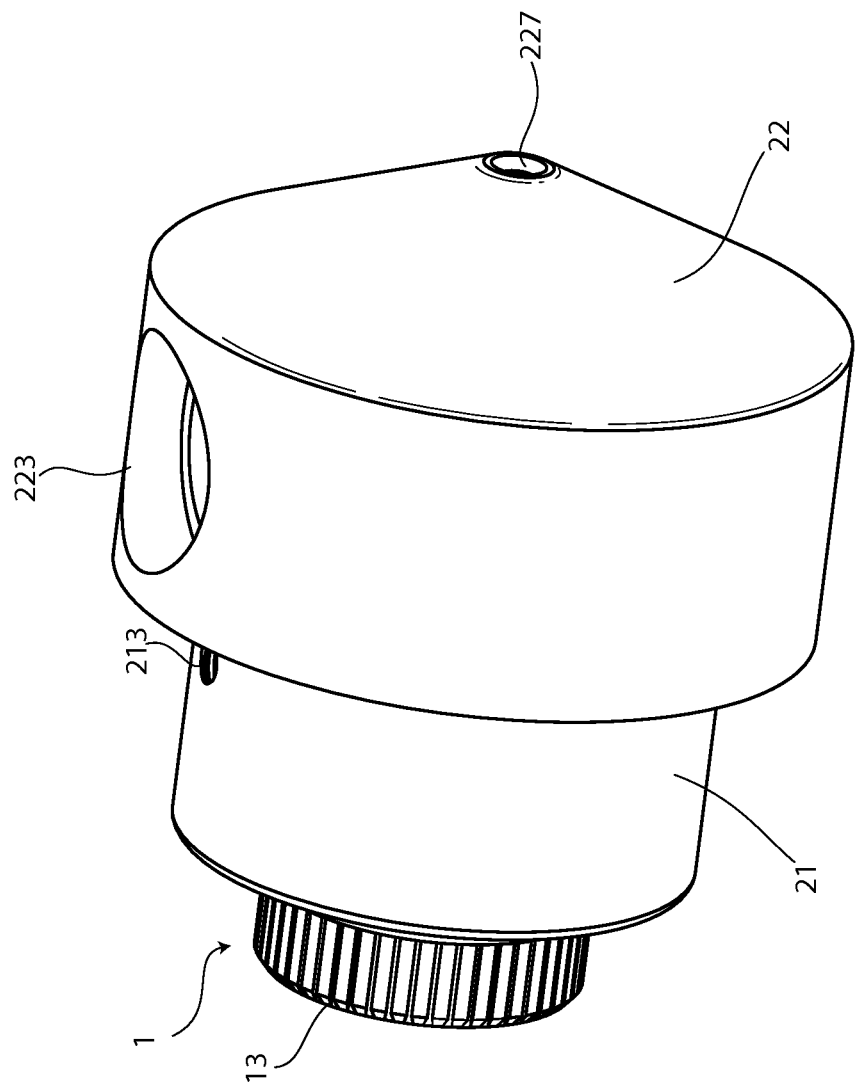
FIG. 8 is a perspective view of the nozzle body inserted into the nozzle adapter.
Figure 9:
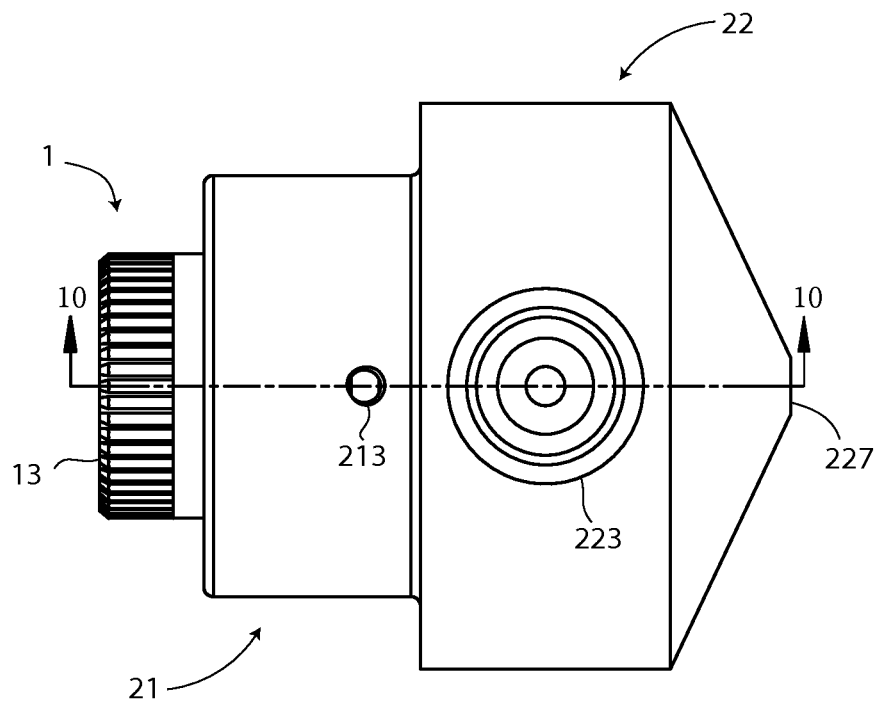
FIG. 9 is a top plan view of the nozzle body inserted into the nozzle adapter showing a plane upon which a sectional view is taken and shown in FIG. 10.

In reference to FIG. 8-10, the nozzle body 1 is inserted into the nozzle adapter 2. The nozzle 16 is positioned in the nozzle cavity 226 and the nozzle body 1 is inserted into the nozzle body cavity 215. With the nozzle 16 being inserted into the nozzle cavity 226, the O-ring seal 15 serves to seal the nozzle cavity 226 from the nozzle body cavity 215. The O-ring seal 15 provides an air tight seal between the nozzle cavity 226 and the nozzle body cavity 215. The nozzle body 1 and the nozzle 16 are secured into the nozzle body cavity 215 and the nozzle cavity 226 by means of the locking screw 212, respectively. The locking screw 212 is inserted and threaded through the locking shred 211 to engage the locking indentation 11 on the nozzle body 1. By engaging onto the locking indentation 11, the nozzle body 1 is held within the nozzle adapter 2. The adjustment screw 214 is inserted and threaded through the adjustment shred 213 to engage the adjustment indentation 12. To complete the nozzle 16 and adapter assembly, a compressed gas nozzle is inserted and secured into the gas inlet port 223 on the adapter head 22. The connection of the compressed gas nozzle leaves the only opening to the nozzle cavity 226 to be the adapter outlet 227. With the nozzle 16 being inserted into the nozzle cavity 226, the diffuser 162 is positioned in concentric relationship to the adapter outlet 227. The user is able to make adjustments to the nozzle body 1 by means of the adjustment screw 214 and the plurality of ridges 13. The plurality of ridges 13 allows the user to align the nozzle gas inlet opening 164 of the nozzle body 1 to the nozzle gas branch channel 225. By adjusting the adjustment screw 214, the user is able to control slight forwards or backward movements of the nozzle 16 within the nozzle cavity 226.

In reference to FIG. 10, the compressed gas is input into the nozzle cavity 226 around the nozzle 16 through the gas inlet port 223 and rushes out of the present invention through the adapter outlet 227. Additionally, the compressed gas also travels through the gas tubes 224 and out the adapter outlet 227. As the injected compressed gas enters the limited space within the nozzle cavity 226 and rushes out of the adapter hole, a vacuum is created at the diffuser 162 due to the Venturi effect. With the nozzle body 1 being connected to the water feed 32, the vacuum created by the compressed gas pulls water from the reservoir 3 through the water feed 32 and out the diffuser 162. Before the compressed gas is injected into the gas inlet port 223, the entire assembly of the present invention possesses a starting pressure of 0 psi. Ideally, to achieve a de-correlation effect on the water particles that is dispensed from the diffuser 162, the water from the reservoir 3 is to be pulled at a vacuum with pressure of −0.5 bar (−7.25 psi). The process of de-correlation requires the present invention to apply a consistent amount of pressure and gas velocity onto the water traveling through the plurality of nozzle tubes 161. By means a controlled system, de-correlation is able to change the nature of the water particles being dispensed through the diffuser 162. Resultantly, the interaction between each dispensed water particle is affected. Instead of being attracted to one another or towards surface, the water particles remain separated for humidifying the environment the present invention is being used in. The present invention is able to generate the de-correlation effect through the uniquely structured nozzle 16 and nozzle cavity 226. In the preferred embodiment of the present invention, the plurality of nozzle tubes 161 are 3 equally sized tubes and the plurality of pockets 165 are two elongated pockets between each of the nozzle tubes 161. The plurality of pockets 165 is connected to the gas inlet port 223 by means of the nozzle gas inlet channel 163. The nozzle gas inlet channel 163 is aligned with the nozzle gas branch channel 225 by the nozzle gas inlet opening 164. The alignment of the of the nozzle gas inlet channel 163 and the nozzle gas branch channel 225 allow the compressed gas to be channeled into the plurality of pockets 165. The de-correlation of the water particles is achieved when the three streams of water in the plurality of tubes are subjected to a specific pressure and vacuum. The pressure and vacuum applied to plurality of nozzle tubes 161 inside the nozzle 16 by the compressed air in the nozzle cavity 226 and the plurality of pockets 165 creates the necessary turbulence that affects the properties of the water particles. The pressurized gas flowing in the nozzle cavity 226 is able to affect the nozzle tubes 161 that are positioned towards the outer surface of the nozzle 16 and the plurality of pockets 165 is able to affect the middle nozzle tube. The water being dispersed by the diffuser 162 is then pushed out by the compressed gas rushing out of the adapter outlet 227. With the de-correlation of the water particles, the present invention is able to diffuse small water particles that collectively form fog. Although the water particles that are diffused by the present invention are not attracted to one another, the water particles can still attract any solid matter smaller than 3 microns. This attraction of solid matter gives the present invention the ability to suppress dust floating in the air in the environment.

For the present invention to achieve the optimal pressure and vacuum, the user can manually adjust the stress and spacing between the male and female part of the nozzle 16 and nozzle adapter 2. The user is able to manually adjust this space by means of the adjustment indentation 12. The user can tighten the adjustment screw 214 that is engaged to the adjustment indentation 12 to move the nozzle 16 further into the nozzle cavity 226. By moving the nozzle 16 further into the nozzle cavity 226, the amount of remaining free space left in the nozzle cavity 226 is reduced. Reducing the amount of free space that is unoccupied by the nozzle 16 affects the amount of pressure that the nozzle 16 and the plurality of nozzle tubes 161 will experience. This increase in pressure will result in the increase in turbulence of the water particles in the water streaming in the plurality of nozzle tubes 161. Additionally, by decreasing the free space within the nozzle cavity 226, the pressurized gas is forced out of the nozzle 16 and adapter outlet 227 at a higher velocity. Resultantly, the vacuum created by the pressurized gas is strengthened. This increase in vacuum strength will pull the water from the water reservoir 3 at a higher rate for quicker production of fog. The velocity of the compressed gas, the stress and spacing between the nozzle 16 and the nozzle adapter 2 both proportionally control the correlation factor for the water particles.

During the usage of the present invention to create fog, water is constantly being drawn from the reservoir 3 by means of the water feed 32. As water is drawn from the reservoir 3, the same amount of water is required to replace the drawn water. The reservoir 3 achieves this by means of a float valve 31. As water leaves the reservoir 3, the level of water in the reservoir 3 is lowered. As a result, the float on the float valve 31 is lowered, causing the float valve 31 to open passage for the liquid source 33 to release water into the reservoir 3. Once the liquid source 33 has fully replenished the reservoir 3 to a sufficient amount of water, the float will reach a designated level that will block the liquid source 33 from releasing more water. With the nozzle 16 drawing water from the reservoir 3, the reservoir 3 undergoes a continuous cycle of water being drawn and filled.

Although the invention has been explained in relation to its preferred embodiment, it is to be understood that many other possible modifications and variations can be made without departing from the spirit and scope of the invention as hereinafter claimed.

What is claimed is:

1. An apparatus for dispensing fog comprises,
a nozzle body;
a nozzle adapter;
a reservoir;
the nozzle body comprises a locking indentation, an adjustment indentation, a plurality of ridges, a water feed port tank, an o-ring seal, and a nozzle;
the nozzle adapter comprises an adapter neck and an adapter head;
the adapter neck comprises a locking shred, a locking screw, an adjustment shred, an adjustment screw, and a nozzle body cavity;
the adapter head comprises a mounting shred, a mounting screw, a gas inlet port, gas tubes, a nozzle gas branch channel, nozzle cavity, and an adapter outlet;
the reservoir comprises a float valve, a water feed, and a liquid source; and
the nozzle comprises a plurality of nozzle tubes, a diffuser, a nozzle gas inlet channel, and a plurality of pockets.

2. The apparatus for dispensing fog as claimed in claim 1 comprises,
the nozzle body having a front end and a rear end;
the locking indentation being positioned peripherally about the nozzle body;
the adjustment indentation being positioned peripherally about the nozzle body;
the locking indentation being adjacent to the adjustment indentation;
the plurality of ridges being positioned peripherally adjacent to the rear end of the nozzle body;
the nozzle being protruded from the front end of the nozzle body;
the nozzle being positioned in concentric relationship to the nozzle body;
the water feed port tank being a recessed space positioned on the rear end of the nozzle body; and
the o-ring seal being positioned peripherally about the nozzle and being connected to the front end of the nozzle body.

3. The apparatus for dispensing fog as claimed in claim 2 comprises,
the plurality of nozzle tubes being positioned within the nozzle;
the plurality of nozzle tubes being connected to the water feed port tank and the diffuser;
the diffuser being positioned on the nozzle opposite to the front end of the nozzle body;
the diffuser comprises of a plurality of diffuser holes;
the plurality of pockets being positioned within the nozzle and in between the plurality of nozzle tubes;
the plurality of pockets being empty elongated spaces;
the nozzle gas inlet opening being positioned on the front end of the nozzle body; and the nozzle gas inlet opening being connected to the plurality of pockets by the nozzle gas inlet channel.

4. The apparatus for dispensing fog as claimed in claim 1 comprises,
the nozzle adapter having a front adapter end and a rear adapter end;
the adapter neck being connected to the adapter head;
the nozzle body cavity being a recessed body space positioned on a rear adapter end of the adapter neck;
the locking shred being positioned on the adapter neck leading into the nozzle body cavity; and
the adjustment shred being positioned on the adapter neck leading into the nozzle body cavity.

5. The apparatus for dispensing fog as claimed in claim 4 comprises,
the nozzle cavity being a cavity positioned within the adapter head;
the nozzle cavity being shaped to the nozzle;
the nozzle cavity being connected to the adapter outlet;
the adapter outlet being positioned on the front side of the adapter head;
the mounting shred being a threaded circular recessed space positioned on the adapter head;
the gas inlet port being an indented hole positioned on the adapter head and leading into the nozzle cavity;
the gas tubes being connected to the gas inlet port and the adapter outlet;
the gas tube being positioned adjacent to the nozzle cavity; and
the gas inlet port being connected to the nozzle body cavity by means of the nozzle gas branch channel.

6. The apparatus for dispensing fog as claimed in claim 5 comprises,
the nozzle being positioned in the nozzle cavity;
the nozzle body being positioned in the nozzle body cavity;
the nozzle gas branch channel being aligned with the nozzle gas inlet opening;
the nozzle body being secured into the nozzle body cavity by means of the locking screw;
the locking screw being inserted through the locking shred and engaged to the locking indentation; and
the adjustment screw being inserted through the adjustment shred and engaged to the adjustment indentation.

7. The apparatus for dispensing fog as claimed in claim 1 comprises,
the float valve being connected to the liquid source; and
the float valve connecting the liquid source to the reservoir.

8. The apparatus for dispensing fog as claimed in claim 7 comprises,
the water feed port tank being connected to the reservoir by means of the water feed; and
the water feed being a tube channeling water into the nozzle.

9. An apparatus for dispensing fog comprises,
a nozzle body;
a nozzle adapter;
a reservoir;
the nozzle body comprises a locking indentation, an adjustment indentation, a plurality of ridges, a water feed port tank, an o-ring seal, and a nozzle;
the nozzle adapter comprises an adapter neck and an adapter head;
the adapter neck comprises a locking shred, a locking screw, an adjustment shred, an adjustment screw, and a nozzle body cavity;
the adapter head comprises a mounting shred, a mounting screw, a gas inlet port, gas tubes, a nozzle gas branch channel, nozzle cavity, and an adapter outlet;
the reservoir comprises a float valve, a water feed, and a liquid source;
the nozzle comprises a plurality of nozzle tubes, a diffuser, a nozzle gas inlet channel, and a plurality of pockets;
the nozzle adapter having a front adapter end and a rear adapter end;
the adapter neck being connected to the adapter head;
the nozzle body cavity being a recessed body space positioned on a rear adapter end of the adapter neck;
the locking shred being positioned on the adapter neck leading into the nozzle body cavity;
the adjustment shred being positioned on the adapter neck leading into the nozzle body cavity;
the nozzle body having a front end and a rear end;
the locking indentation being positioned peripherally about the nozzle body;
the adjustment indentation being positioned peripherally about the nozzle body; and
the locking indentation being adjacent to the adjustment indentation.

10. The apparatus for dispensing fog as claimed in claim 9 comprises,
the plurality of ridges being positioned peripherally adjacent to the rear end of the nozzle body;
the nozzle being protruded from the front end of the nozzle body;
the nozzle being positioned in concentric relationship to the nozzle body;
the water feed port tank being a recessed space positioned on the rear end of the nozzle body;
the o-ring seal being positioned peripherally about the nozzle and being connected to the front end of the nozzle body;
the plurality of nozzle tubes being positioned within the nozzle;
the plurality of nozzle tubes being connected to the water feed port tank and the diffuser; and
the diffuser being positioned on the nozzle opposite to the front end of the nozzle body.

11. The apparatus for dispensing fog as claimed in claim 10 comprises,
the diffuser comprises of a plurality of diffuser holes;
the plurality of pockets being positioned within the nozzle and in between the plurality of nozzle tubes;
the plurality of pockets being empty elongated spaces;
the nozzle gas inlet opening being positioned on the front end of the nozzle body; and
the nozzle gas inlet opening being connected to the plurality of pockets by the nozzle gas inlet channel.

12. The apparatus for dispensing fog as claimed in claim 9 comprises,
the nozzle cavity being a cavity positioned within the adapter head;
the nozzle cavity being shaped to the nozzle;
the nozzle cavity being connected to the adapter outlet;
the adapter outlet being positioned on the front side of the adapter head;
the mounting shred being a threaded circular recessed space positioned on the adapter head;
the gas inlet port being an indented hole positioned on the adapter head and leading into the nozzle cavity;
the gas tubes being connected to the gas inlet port and the adapter outlet;
the gas tube being positioned adjacent to the nozzle cavity;

the gas inlet port being connected to the nozzle body cavity by means of the nozzle gas branch channel;
the nozzle being positioned in the nozzle cavity; and
the nozzle body being positioned in the nozzle body cavity.

13. The apparatus for dispensing fog as claimed in claim 12 comprises,
the nozzle gas branch channel being aligned with the nozzle gas inlet opening;
the nozzle body being secured into the nozzle body cavity by means of the locking screw;
the locking screw being inserted through the locking shred and engaged to the locking indentation; and
the adjustment screw being inserted through the adjustment shred and engaged to the adjustment indentation.

14. The apparatus for dispensing fog as claimed in claim 9 comprises,
the float valve being connected to the liquid source; and
the float valve connecting the liquid source to the reservoir.

15. The apparatus for dispensing fog as claimed in claim 14 comprises,
the water feed port tank being connected to the reservoir by means of the water feed; and
the water feed being a tube channeling water into the nozzle.

16. An apparatus for dispensing fog comprises,
a nozzle body;
a nozzle adapter;
a reservoir;
the nozzle body comprises a locking indentation, an adjustment indentation, a plurality of ridges, a water feed port tank, an o-ring seal, and a nozzle;
the nozzle adapter comprises an adapter neck and an adapter head;
the adapter neck comprises a locking shred, a locking screw, an adjustment shred, an adjustment screw, and a nozzle body cavity;
the adapter head comprises a mounting shred, a mounting screw, a gas inlet port, gas tubes, a nozzle gas branch channel, nozzle cavity, and an adapter outlet;
the reservoir comprises a float valve, a water feed, and a liquid source;
the nozzle comprises a plurality of nozzle tubes, a diffuser, a nozzle gas inlet channel, and a plurality of pockets;
the nozzle adapter having a front adapter end and a rear adapter end;
the adapter neck being connected to the adapter head;
the nozzle body cavity being a recessed body space positioned on a rear adapter end of the adapter neck;
the locking shred being positioned on the adapter neck leading into the nozzle body cavity;
the adjustment shred being positioned on the adapter neck leading into the nozzle body cavity;
the nozzle body having a front end and a rear end;
the locking indentation being positioned peripherally about the nozzle body;
the adjustment indentation being positioned peripherally about the nozzle body;
the locking indentation being adjacent to the adjustment indentation;
the plurality of ridges being positioned peripherally adjacent to the rear end of the nozzle body;
the nozzle being protruded from the front end of the nozzle body;
the nozzle being positioned in concentric relationship to the nozzle body; and
the water feed port tank being a recessed space positioned on the rear end of the nozzle body.

17. The apparatus for dispensing fog as claimed in claim 16 comprises,
the o-ring seal being positioned peripherally about the nozzle and being connected to the front end of the nozzle body;
the plurality of nozzle tubes being positioned within the nozzle;
the plurality of nozzle tubes being connected to the water feed port tank and the diffuser;
the diffuser being positioned on the nozzle opposite to the front end of the nozzle body;
the diffuser comprises of a plurality of diffuser holes;
the plurality of pockets being positioned within the nozzle and in between the plurality of nozzle tubes;
the plurality of pockets being empty elongated spaces;
the nozzle gas inlet opening being positioned on the front end of the nozzle body; and
the nozzle gas inlet opening being connected to the plurality of pockets by the nozzle gas inlet channel.

18. The apparatus for dispensing fog as claimed in claim 16 comprises,
the nozzle cavity being a cavity positioned within the adapter head;
the nozzle cavity being shaped to the nozzle;
the nozzle cavity being connected to the adapter outlet;
the adapter outlet being positioned on the front side of the adapter head;
the mounting shred being a threaded circular recessed space positioned on the adapter head;
the gas inlet port being an indented hole positioned on the adapter head and leading into the nozzle cavity;
the gas tubes being connected to the gas inlet port and the adapter outlet;
the gas tube being positioned adjacent to the nozzle cavity;
the gas inlet port being connected to the nozzle body cavity by means of the nozzle gas branch channel;
the nozzle being positioned in the nozzle cavity; and
the nozzle body being positioned in the nozzle body cavity.

19. The apparatus for dispensing fog as claimed in claim 18 comprises,
the nozzle gas branch channel being aligned with the nozzle gas inlet opening;
the nozzle body being secured into the nozzle body cavity by means of the locking screw;
the locking screw being inserted through the locking shred and engaged to the locking indentation; and
the adjustment screw being inserted through the adjustment shred and engaged to the adjustment indentation.

20. The apparatus for dispensing fog as claimed in claim 16 comprises,
the float valve being connected to the liquid source;
the float valve connecting the liquid source to the reservoir;
the water feed port tank being connected to the reservoir by means of the water feed; and
the water feed being a tube channeling water into the nozzle.

* * * * *